US012224116B2

(12) United States Patent
Fischer et al.

(10) Patent No.: US 12,224,116 B2
(45) Date of Patent: Feb. 11, 2025

(54) ELECTROMAGNETIC ACTUATOR AND USE THEREOF

(71) Applicant: Nakanishi Jaeger GmbH, Ober-Mörlen (DE)

(72) Inventors: Axel Fischer, Ober-Mörlen (DE); Rolf Ertelt, Wetzlar (DE); Frank Wolff, Herborn (DE)

(73) Assignee: Nakanishi Jaeger GmbH, Ober-Mörlen (DE)

( * ) Notice: Subject to any disclaimer, the term of this patent is extended or adjusted under 35 U.S.C. 154(b) by 77 days.

(21) Appl. No.: 17/916,243

(22) PCT Filed: Mar. 26, 2021

(86) PCT No.: PCT/DE2021/100305
§ 371 (c)(1),
(2) Date: Sep. 30, 2022

(87) PCT Pub. No.: WO2021/197545
PCT Pub. Date: Oct. 7, 2021

(65) Prior Publication Data

US 2023/0154660 A1 May 18, 2023

(30) Foreign Application Priority Data

Apr. 1, 2020 (DE) ..................... 10 2020 109 120.6

(51) Int. Cl.
*H01F 7/16* (2006.01)
*H01F 7/06* (2006.01)

(52) U.S. Cl.
CPC ........... *H01F 7/1646* (2013.01); *H01F 7/066* (2013.01); *H01F 7/1653* (2013.01)

(58) Field of Classification Search
CPC ...... H01F 7/1646; H01F 7/066; H01F 7/1653; H01F 2007/086; H01F 2007/1669
See application file for complete search history.

(56) References Cited

U.S. PATENT DOCUMENTS 5,257,014 A 10/1993 Zimmermann
5,394,131 A 2/1995 Lungu
(Continued)

FOREIGN PATENT DOCUMENTS

DE 198 06 720 A1 8/1998
DE 197 12 293 A1 10/1998
(Continued)

OTHER PUBLICATIONS

International Search Report in PCT/DE2021/100305, mailed Jul. 2, 2021.

*Primary Examiner* — Bernard Rojas
(74) *Attorney, Agent, or Firm* — Collard & Roe, P.C.

(57) ABSTRACT

In an electromagnetic actuator having a housing, two ferromagnetic pole shoes are distanced from each other and are rigidly connected to the housing. A mobile structure, which can be moved in the housing along an axis between two end positions, is arranged between the pole shoes, includes at least one magnet system, and is connected to a shaft that is axially displaceable in the housing. The magnet system includes at least one arrangement of at least one permanent magnet polarized radially with respect to the axis, and an annular coil connectable to a current source. The magnet system forms, together with the pole shoes, an air gap system having axially variable air gaps. The mobile structure is securable in each end position without excitation of the coil and is movable from one assumed end position into the opposite end position by excitation of the coil.

10 Claims, 4 Drawing Sheets

(56) References Cited

U.S. PATENT DOCUMENTS

Figure 1:
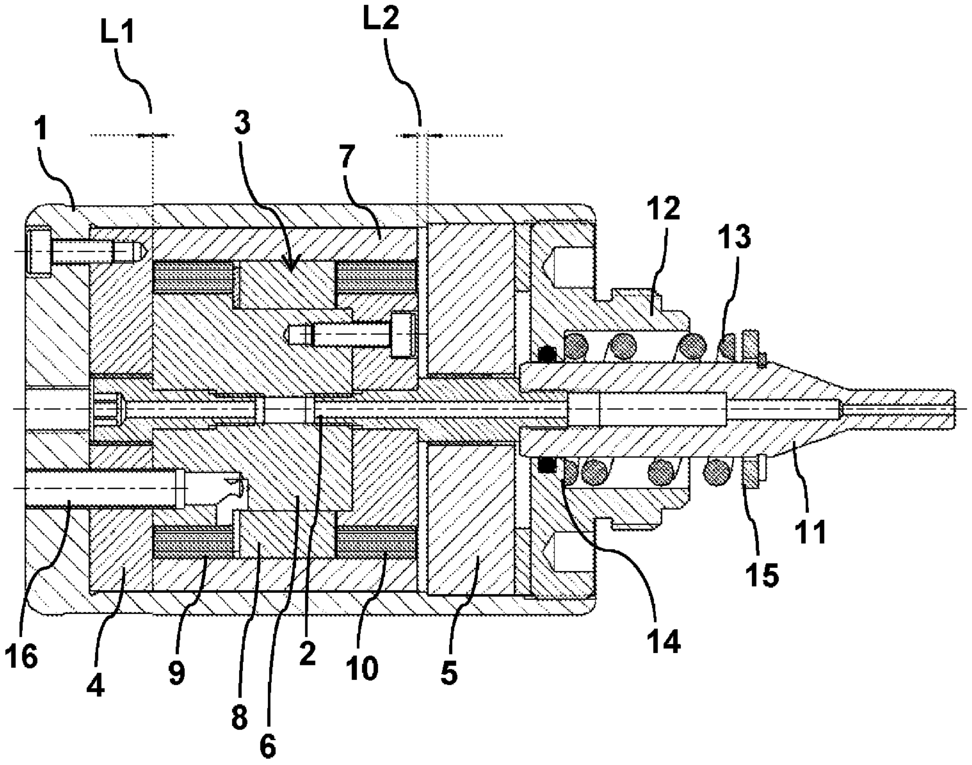

| | | | | | |
|---|---|---|---|---|---|
| 10,024,453 | B2 * | 7/2018 | Robertson | ............... | F16K 11/24 |
| 10,522,313 | B2 * | 12/2019 | Mecklenburg | .......... | H01F 7/122 |
| 10,848,044 | B1 * | 11/2020 | Miesner | ................. | H02K 33/06 |
| 2012/0175974 | A1 | 7/2012 | Robertson | | |
| 2016/0293310 | A1 | 10/2016 | Kohlhafer | | |
| 2017/0175919 | A1 | 6/2017 | Robertson | | |

FOREIGN PATENT DOCUMENTS

| | | | |
|---|---|---|---|
| DE | 102 07 828 | B4 | 9/2003 |
| DE | 10 2013 102 400 | A1 | 9/2014 |
| EP | 0 568 028 | A1 | 11/1993 |
| EP | 1 219 943 | A2 | 7/2002 |
| FR | 926 032 | A | 4/1946 |
| JP | H07-43630 | Y2 | 10/1995 |

* cited by examiner

ELECTROMAGNETIC ACTUATOR AND USE THEREOF

CROSS REFERENCE TO RELATED APPLICATIONS

This application is the National Stage of PCT/DE2021/100305 filed on Mar. 26, 2021, which claims priority under 35 U.S.C. § 119 of German Application No. 10 2020 109 120.6 filed on Apr. 1, 2020, the disclosure of which is incorporated by reference. The international application under PCT article 21 (2) was not published in English.

The invention relates to an electromagnetic actuator having a housing, two ferromagnetic pole shoes which are arranged at a distance from one another and are rigidly connected to the housing, and a mobile structure which can be moved in the housing along an axis between two end positions, and which is arranged between the pole shoes and comprises at least one magnet system. The invention also relates to a use of an electromagnetic actuator with a motor spindle.

DE 197 12 293 A1 discloses an electromagnetically operating actuator comprising two magnet systems which are spaced apart from one another and each having an excitation coil, between which systems an armature disc, rigidly connected to an adjustment shaft, is arranged. The armature disc is located between two opposingly acting springs and is movable by the magnet systems into two switching positions. One of the magnet systems is assigned a permanent magnet that is polarised in the direction of movement of the armature and stabilises the armature in a switching position, in the deenergised state. If the armature is to be held in the other switching position, energisation is permanently required.

Furthermore, EP 0 568 028 A1 discloses an electromagnetic linear motor consisting of an armature, two inner pole shoes, two outer pole shoes, two permanent magnets as well as one coil, wherein the armature, together with the inner pole shoes and the outer pole shoes, forms an air gap system consisting of four magnetic air gaps that can be changed in the axial direction and are of the same size in the central position. The permanent magnets stabilise the armature in the case of a denergised coil in the central position. The pole shoes are half-shell-shaped and form two fixedly polarised magnet systems, together with the half-shell-shaped permanent magnets.

An electromagnetic solenoid for achieving high holding forces in the stable end positions is known from DE 102 07 828 B4. It consists of a stator having two axially spaced magnet systems, each comprising an excitation winding for generating an electromagnetic flux. An armature is guided between the two magnet systems and carries a permanent magnet arrangement which is polarised perpendicular to its direction of movement for permanently holding the armature without energisation of the excitation winding. In this case, the permanent magnet arrangement lies between the two excitation windings, as a result of which its effectiveness is impaired as a result of leakage flux. In addition, the usually brittle material of the permanent magnet arrangement can suffer from a shock-like movement of the armature.

US 2016/0 293 310 A1 describes an electromagnetic actuator which can generate a symmetrical bidirectional force. The device comprises a housing made of a ferromagnetic material and a shaft made of a magnetically inert material that is movable along an axis within the housing. In one actuator type, permanent magnets are arranged on opposite inner end walls of the housing and an electromagnetic coil is arranged on a central part of the shaft.

U.S. Pat. No. 5,257,014A1 discloses an electrical actuator which comprises a core and a cylindrical shell which is arranged around the core and defines an annular space therebetween, in which in turn a coil is provided. A DC amplifier transmits an excitation signal in response to a desired position signal. The coil is designed such that it receives the excitation signal, and in response generates a magnetic field proportional to the magnitude of the excitation signal and causes movement of the coil or core relative to the other.

DE 10 2013 102 400 A1 discloses an electromagnetic actuator comprising a housing and an armature which is movable in the housing between two end positions and has two armature discs, arranged at a distance from one another, and an armature shaft. In the housing two annular arrangements of permanent magnets that are polarised radially in the same direction with respect to the axis are arranged between the armature discs, wherein an annular coil which can be connected to a current source is arranged between the two permanent magnets. The armature can be secured in two end positions without excitation of a coil, and can be moved from one end position, taken up in each case, into the opposite end position, by excitation of the coil.

The object of the invention is to provide an electromagnetic actuator of the type mentioned at the outset which is stable in both end positions without excitation with current, and can absorb high holding forces at least in one end position. The actuator should still be simple and inexpensive to manufacture.

This object is achieved by an electromagnetic actuator having the features specified in claim 1. Advantageous embodiments of the actuator are specified in the dependent claims.

According to the invention, the electromagnetic actuator comprises a housing, two ferromagnetic pole shoes which are arranged at a distance from one another and are rigidly connected to the housing, a mobile structure which is movable along an axis in the housing, between two end positions, and is arranged between the pole shoes and comprises at least one magnet system, which structure is connected to a shaft which is axially displaceable in the housing, wherein the magnet system comprises radially inner and radially outer pole bodies made of a material which conducts the magnetic flux, at least one arrangement of one or more permanent magnets which are polarised radially with respect to the axis, and an annular coil which can be connected to a current source and which, together with the pole shoes, forms an air gap system having axially variable air gaps, it being possible for the mobile structure to be secured in each of the two end positions without excitation of the coil, and to be movable out of an end position, assumed in each case, and into the opposite end position, by excitation of the coil.

The invention has the advantage, compared with the prior art, that the mobile structure can be secured in both end positions without excitation of the coil. If the mobile structure is to be moved into the opposite end position, the coil will be energised. As a result, simple and rapid switching of the actuator is possible. Furthermore, the use of only one coil contributes to low manufacturing costs and a small overall size. Furthermore, the mobile structure, together with the magnetic components, is securely embedded in the housing and is thereby protected against dynamic stress.

In one embodiment of the actuator, the permanent magnet can consist of individual magnets arranged in an annular manner, or can also be designed in the form of a ring magnet. The design of the shape of the permanent magnets or of the permanent magnet is free—shapes such as, annular, angular or the like are possible. Furthermore, magnets made of sensitive magnetic materials, for example composite materials, can be used, which enable high polarisation values and field strengths.

It can be advantageous if the magnet system has an annular arrangement of radially polarised permanent magnets which are arranged on both sides of the coil. In a preferred embodiment of the invention, the magnet system and the coil are rotationally symmetrical. However, designs differing from this are also possible.

The magnet system has radially inner and radially outer pole bodies made of a material that conducts the magnetic flux. The advantageous arrangement of the permanent magnets between pole bodies and directly adjacent to the pole shoes enables high holding forces when the coil is not excited with current. According to a further proposal of the invention, the magnet or the magnets and the coil are arranged between pole bodies made of soft magnetic material, which can be, for example, in the shape of rings. The axial thickness of the pole shoes is preferably the same, but can also be different, in order to achieve different holding forces in the two end positions.

In an advantageous embodiment, it can be provided that the shaft is guided in plain bearings which are present in the pole shoes.

According to the invention, the housing of the actuator, which also forms the chamber in which the components of the actuators are present, preferably consists of a non-magnetic material in order to prevent a scattering of the magnetic flux and to concentrate the flux on the mobile structure.

It is preferred that an air gap be present between the housing and the outer pole body. This prevents friction between the mobile structure and the housing. However, it can also be provided that sliding bushes or other means which support a movement of the mobile structure in the housing are present here.

A particularly advantageous use of the actuator according to the invention comprises a motor spindle having an actuator as explained above, which contains, in a spindle housing, an electric motor and a spindle which can be rotatably driven thereby, comprising a tool holder for a tool for workpiece machining, the spindle being designed as a hollow shaft and comprising, in its longitudinal hole, a clamping device for firmly clamping a tool or a tool holder, the housing of the actuator being attached to the spindle housing directly or indirectly, and it being possible for the mobile structure to be brought into operative connection, in a force-transmitting and movement-transmitting manner, with an element of the clamping device which is axially displaceable in a longitudinal hole in the spindle, and it being possible for the clamping device to move into a release position, which, in an advantageous embodiment, can take place with the collaboration of a spring arranged around the shaft of the mobile structure or the tappet thereof. The present disclosure thus also comprises the combination of a disclosed electrical actuator with a motor spindle. The described advantages of the electrical actuator apply analogously to the use or combination.

The use of the actuator in a motor spindle makes it possible to dispense with complex actuators which are, in many cases, considered disadvantageous and are driven by pneumatic or hydraulic energy, which have ever since been customary for actuating tool clamping devices in motor spindles. With the aid of the actuator according to the invention, sufficiently high actuating forces can be achieved with a suitable size and acceptable weight in order to press the spring clamping sets of such tool clamping devices together and to release the clamping device. By means of the device according to the invention, the holding forces which are required for holding the tool clamping device in the release position can furthermore be generated using the permanent magnets, such that the coil only has to be actuated briefly in order to release the tool clamping device and to return to the clamping position. As a result, fast changeover times can also be achieved.

It can be provided that a spring be arranged around the tappet so that the mobile structure can be moved counter to the spring force, into an end position. Depending on the embodiment, the spring can support the actuator when the clamping device is released or when it is returned to the clamping position. Shorter changeover times are thereby possible.

The use according to the invention enables in particular motor spindles, which require only one drive energy, namely electrical current, for clamping and releasing the tool and for driving the tool for carrying out machining operations.

The actuator can advantageously be attached directly to the motor spindle. For this purpose, the actuator can in particular comprise means such as holes or screw connections which enable a quick and reversible connection to a motor spindle. However, the invention also includes embodiments in which the actuating movement and the actuating force are transmitted to the motor spindle by a mechanical transmission system, for example a push-pull cable, or by a hydraulic transmission system, as a result of which the weight of the motor spindle can be kept low.

In addition to the use with a motor spindle, the actuator according to the invention can be used for various applications, such as the clamping of workpieces, the rapid switching of electrical contacts or for the generation of compressed air. Furthermore, applications such as, but not exhaustively, workpiece clamps or table locks, are possible.

Figure 2:
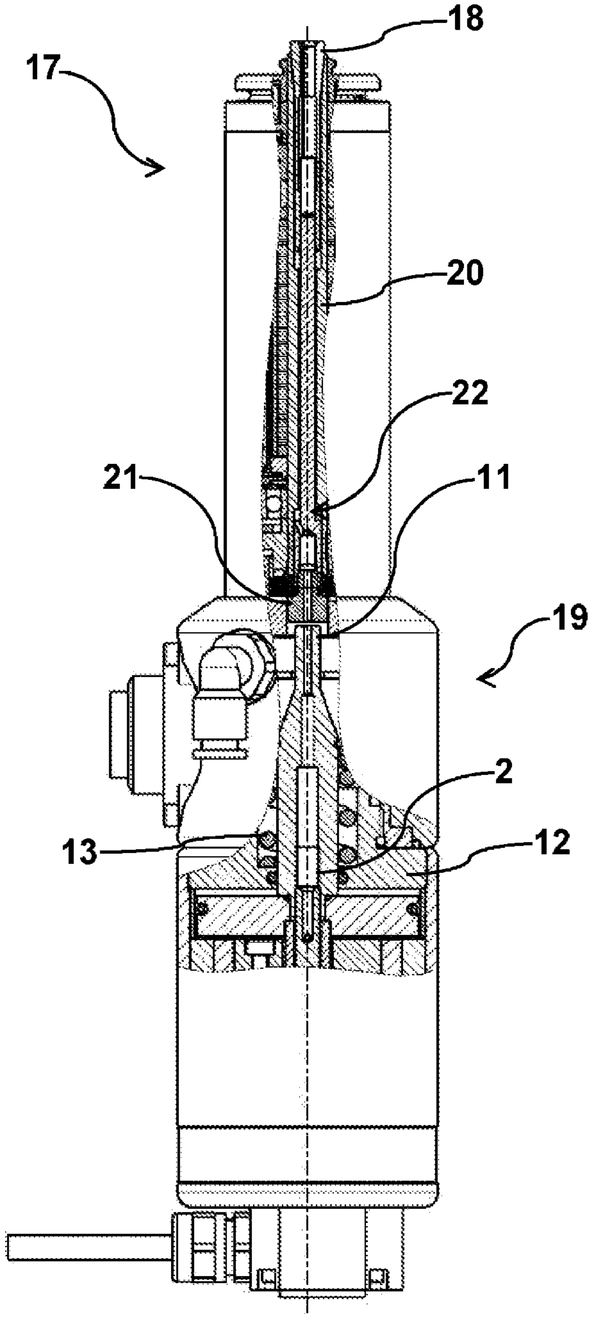
Figure 3:
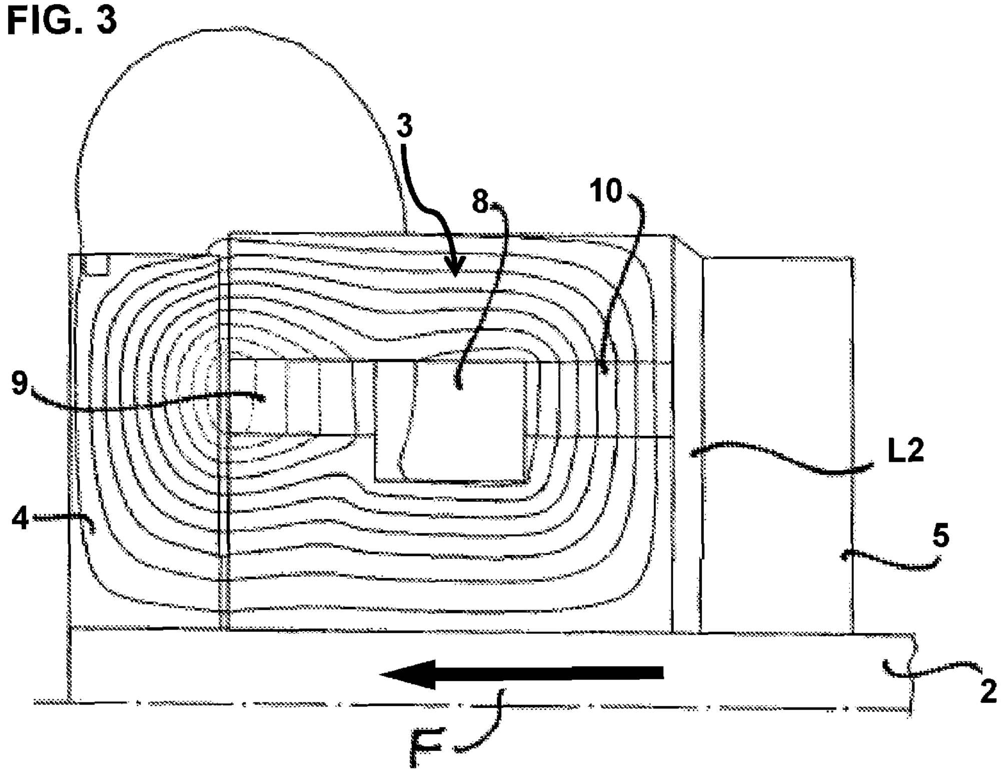
Figure 4:
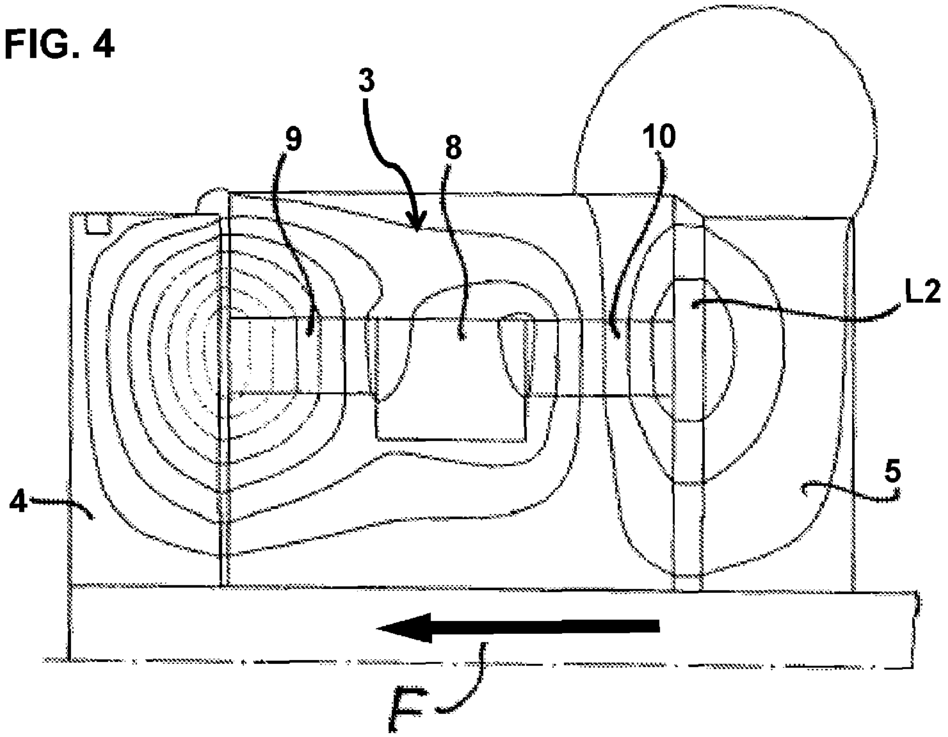
Figure 5:
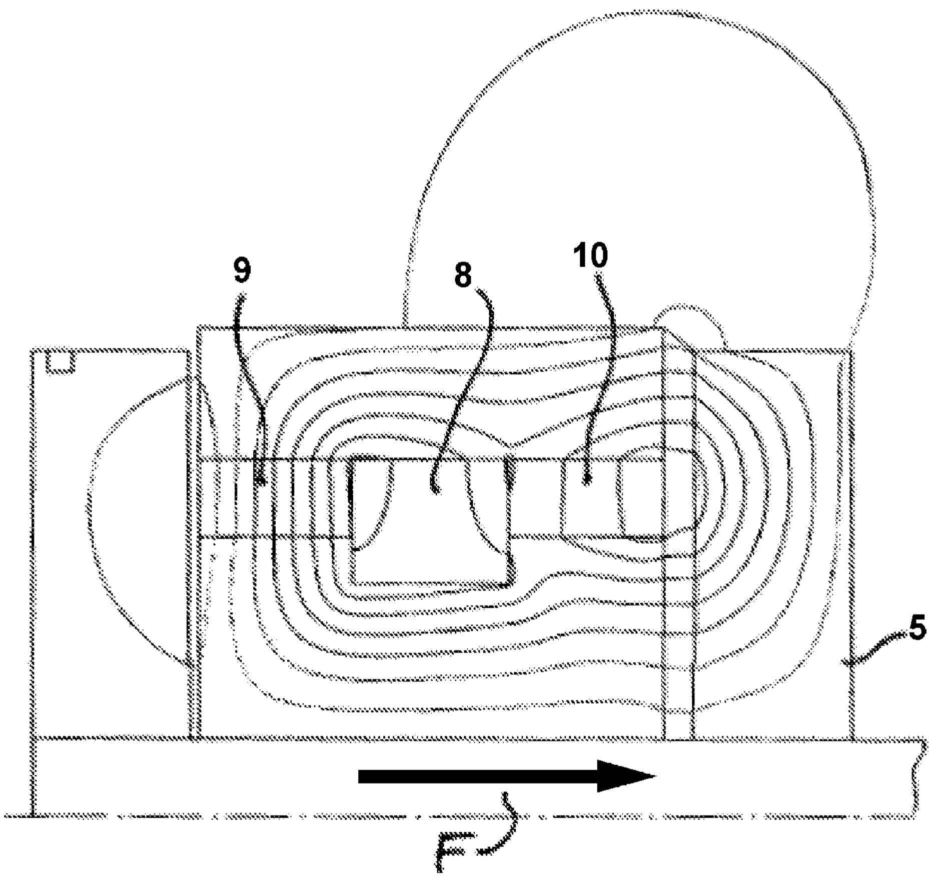

The invention is explained in more detail below with reference to embodiments which are illustrated in the drawings. In the drawings:

FIG. 1 is a cross-section through a preferred electromagnetic actuator,

FIG. 2 is a schematic representation of a motor spindle with an electrical actuator, FIG. 3 is a representation of the field lines when the coil is energised for generating an actuating force in a first direction, FIG. 4 is a representation of the field lines in the case of a deenergised coil and a position maintained by permanent magnet, according to FIG. 3, and FIG. 5 is a representation of the field lines in the case of a coil energised in a reverse direction for generating an actuating force in a second direction.

The electromagnetic actuator shown in FIG. 1 comprises a pot-shaped housing 1. The housing 1 can be formed in one piece or in multiple parts and can comprise, for example, a cover and a base that can be connected to a main body. An armature, which is mounted so as to be movable in the direction of the axis and which is composed of a shaft 2 and a mobile structure 3 fixedly connected thereto, which are arranged between two rotationally symmetrical pole shoes 4, 5 fixedly connected to the housing 1, is located in the housing 1. The pole shoes 4, 5 have parallel side faces and have holes which accommodate a plain bearing for linear guidance of the shaft 2. The front pole shoe 4 can, for example, be fastened to the housing base by means of screw connections. The rear pole shoe 5 can, for example, be fixed in the housing 1 between a shoulder and a peripheral edge of the housing 1.

The mobile structure 3 is arranged in the intermediate space between the pole shoes 4, 5. In one embodiment, the mobile structure 3 can have an inner annular pole body 6 and, at a radial distance therefrom, an outer annular pole body 7. The pole bodies 6, 7 can also be constructed in multiple parts. A coil 8 having at least one winding is located in the space between the two pole bodies 6, 7, and a permanent magnet 9, 10 is located, in each case, on either side of the coil 8. The two permanent magnets 9, 10 are polarised radially in the same direction and thus transversely to the direction of movement of the armature, and, in one embodiment, form a magnet system, in particular together with the pole bodies 6, 7 and the pole shoes 4, 5. The permanent magnets 9, 10 are arranged annularly around the pole body 6 and can be designed as ring magnets or also as an arrangement of individual magnets polarised in the same direction. Other designs of the permanent magnets 9, 10, such as angular permanent magnets, are also possible. The pole bodies 6, 7 and the permanent magnets 9, 10 can be rigidly connected to one another.

Instead of the permanent magnets 9, 10 being arranged symmetrically with respect to the coil 8, these can also be arranged adjacently side-by-side on one side of the coil 8, or formed by a single permanent magnet of corresponding thickness, for example a ring magnet.

An axially variable air gap L1, L2 of an air gap system is located, in each case, between the mobile structure 3 and the pole shoes 4, 5.

The two pole bodies 6, 7 and the pole shoes 4, 5 consist of a material of good conductivity, in particular soft-magnetic material. The shaft 2 can also consist of a magnetic flux-conducting material, but preferably consists of non-magnetic material in order to counteract a scattering of the flux. The housing 1 also consists of non-magnetic material.

In the case of the described electromagnetic actuator, the mobile structure 3 can be held by a comparatively high force in its two end positions by the magnetic force of the permanent magnets 9, 10. The central position of the mobile structure 3 having air gaps L1, L2 of the same size is unstable. In order to move the mobile structure 3 into one or the other end position, the coil 8 is briefly excited with a current, the current direction determining the direction of movement of the mobile structure 3.

FIG. 1 shows a preferred embodiment of the electrical actuator in which the shaft 2 in the form of a tappet 11 projects through a cover 12 which is connected to the housing 1. The cover 12 can be connected to the housing 1 via screw connections or via an internal thread present in the housing. The shaft 2 and the tappet 11 can be designed in one piece or in multiple parts. The same applies to the shaft 2, which can also be formed in one piece or in multiple parts.

A movement of the mobile structure 3 causes the tappet 11 to move in the corresponding direction. A spring 13, which is supported on a shoulder 14 in the cover 12 and on a peripheral edge 15 on the tappet 11, can be arranged around the tappet 11. Depending on the design of the spring, the mobile structure 3 is moved in one or the other direction or into one or other end position, counter to the spring force of the spring 13, the spring 13 supporting the movement of the mobile structure 3 into the opposite end position. The spring 13 can be designed as a tension or compression spring.

In order to ensure a power supply to the coil 8, a hole 16 can be provided in the housing 1.

The electrical actuator can be used, for example, when changing a tool in a motor spindle 17, as shown schematically in FIG. 2. This is only one exemplary use of the device, which is shown by way of example. In this case, the actuator can be fastened with the aid of the cover 12 to an end of a spindle housing 19 facing away from a conical hole 18 for receiving a tool holder. The end of the shaft 2 projecting from the cover can engage, in the form of the tappet 11, in a longitudinal hole in a spindle 20 and, in the position of the mobile structure 3 in which it is retracted into the housing 1, can be located opposite and at a short distance from an end face of an element of a clamping device 22, in particular a tappet 21 of the clamping device 22. In this described position of the actuator, the tool holder can be clamped by the clamping device 22, for example with the aid of the force of disc springs. The mobile structure 3 is held in the retracted position without excitation of the coil 8, by the magnet system consisting of the permanent magnet 9 and pole shoe 4.

If the tool holder with a tool attached thereto is to be changed, the coil 8 is excited by a current after the spindle 20 has been stopped, by means of which current, as shown in FIG. 3, the mobile structure 3 is moved into the position extended further out of the housing 1. In this case, the shaft 2, together with the tappet 11, is moved downwards, counter to the force of the disc springs, such that, for example, a clamping pin of a tool cone of the tool holder engaging in the conical bore 18 is released from the clamping device 22 and the tool cone can be released. The tool holder and the tool fastened thereto can thereby be removed by hand or automatically. The tool cone can be attached either directly to a machining tool or to the tool holder.

After the release of the clamping device 22, the coil 8 is deenergised and the release position of the clamping device 22 is held, counter to the force of the disc springs, without excitation of the coil 8, solely by the permanent magnets 9, 10, as shown in FIG. 3.

After the insertion of the new tool into the receptacle of the spindle 20, the coil 8 is, conversely, energised in order to clamp a new tool and, as shown in FIG. 4, the mobile structure 3 moves back, with the tappet 11. In this case, with the aid of the disc springs, the clamping pin of the new tool is gripped by the clamping device 22 and clamped in the receptacle of the spindle 20. Depending on the design of the spring 13, it can support the movement of the mobile structure 3. That is to say if the spring 13 is designed as a compression spring, the mobile structure 3 will be moved in the direction of the rear pole shoe 5, counter to the spring force of the spring 13, and in the direction of the front pole shoe 4 with the assistance of the spring force. However, the spring 13 can also be designed as a tension spring (not shown), such that the movement of the mobile structure 3 will be assisted in the opposite direction.

FIGS. 3 to 5 show the field lines of the magnetic flux in different operating states of the actuator. A half axial cross-section of the parts conducting the magnetic flux is shown here.

In the example shown in FIG. 3, the coil 8 is excited by a current of such a direction that it generates a coil field which is in the same direction as the field of the permanent magnets 9, 10. The two fields supplement each other and produce a strong electromagnetic flux which is deflected by the permanent magnet 9 and conducted via the pole shoe 4. The field of the permanent magnets 9, 10 is weakened in the direction of the pole shoes 5. As a result, a strong force acts on the mobile structure 3 in the direction of the arrow F, by means of which the mobile structure 3 is moved into the left-hand end position.

FIG. 4 shows the left-hand end position of the mobile structure 3 after de-excitation of the coil 8. The permanent magnet 9 generates a strong field that grips the pole shoe 4 and with a force F holds the mobile structure 3 in the end position. The field of the permanent magnet 9 is additionally strengthened by a portion of the field of the permanent magnet 10. The flux of the permanent magnet 10 conducted through the right-hand pole shoe 5 is greatly weakened by the air gap L2, which is wide here, and is therefore barely effective.

FIG. 5 shows the course of the magnetic flux upon excitation of the coil 8 by a current of the reverse direction, in order to move the mobile structure in the opposite direction. The coil field now strengthens the field of the permanent magnet 9 and weakens the field of the permanent magnet 10, and the permanent magnet 10 deflects the common flux of the coil 8 and flux of the permanent magnet 9 to the pole shoe 5, such that the mobile structure 3 is moved into the right-hand end position.

The invention claimed is:

1. An assembly comprising an electromagnetic actuator and a motor spindle (17), which comprises, in a spindle housing (19), an electric motor and a spindle (20) which can be rotatably driven by the electric motor, and comprising a tool holder for a tool for workpiece machining, wherein the spindle (20) is designed as a hollow shaft and comprises, in the longitudinal hole therein, a clamping device (22) for firmly clamping a tool or a tool holder, wherein the housing (1) of the actuator is fastened directly or indirectly to the spindle housing (19), and wherein the mobile structure (3) can be brought into operative connection, in a force-transmitting and movement-transmitting manner, with an element (21) of the clamping device (22) which is axially displaceable in a longitudinal hole in the spindle (20), and the clamping device (22) can move into a release position, wherein the electromagnetic actuator comprises a housing (1), two ferromagnetic pole shoes (4, 5) which are arranged at a distance from one another and are rigidly connected to the housing, a mobile structure (3) which can be moved in the housing (1) along an axis between two end positions and is arranged between the pole shoes (4, 5) and comprises at least one magnet system, which structure is connected to a shaft (2) which is axially displaceable in the housing (1), wherein the magnet system comprises radially inner and radially outer pole bodies (6, 7) comprising a magnetic flux-conducting material, at least one arrangement of one or more permanent magnets (9, 10) which are polarized radially with respect to the axis, and an annular coil (8) which can be connected to a current source, and forms, together with the pole shoes (4, 5), an air gap system having axially variable air gaps (L1, L2), wherein the mobile structure (3) can be secured in each of the two end positions without excitation of the coil (8), and can be moved out of the end position, taken up in each case, and into the opposite end position, by excitation of the coil (8).

2. The assembly according to claim 1, and wherein the magnet system has an annular arrangement of permanent magnets (9, 10), radially polarized in the same direction, which are arranged on both sides of the coil (8).

3. The assembly according to claim 1, wherein the magnet system and the coil (8) are rotationally symmetrical.

4. The assembly according to claim 1, wherein the radially inner pole body (6) has the form of a ring and extends inside the permanent magnet or the permanent magnets (9, 10) and the coil (8).

5. The assembly according to claim 1, wherein the radially outer pole body (7) annularly surrounds the permanent magnet or the permanent magnets (9, 10) and the coil (8).

6. The assembly according to claim 1, wherein the axial thickness of the pole shoes (4, 5) is different.

7. The assembly according to claim 1, wherein the shaft (2) is guided in plain bearings which are present in the pole shoes (4, 5).

8. The assembly according to claim 1, wherein the housing (1) comprises non-magnetic material.

9. The assembly according to claim 1, wherein an air gap is present between the housing (1) and the outer pole body (7).

10. The assembly according to claim 1, wherein a spring (13) acts directly or indirectly on the shaft (2) in such a way that the movement of the mobile structure (3) into one of the end positions takes place counter to the spring force of the spring.

* * * * *